June 8, 1937.　　　　J. W. BRYCE　　　　2,083,362
RECORDING MECHANISM
Filed Jan. 10, 1931　　　　6 Sheets-Sheet 1
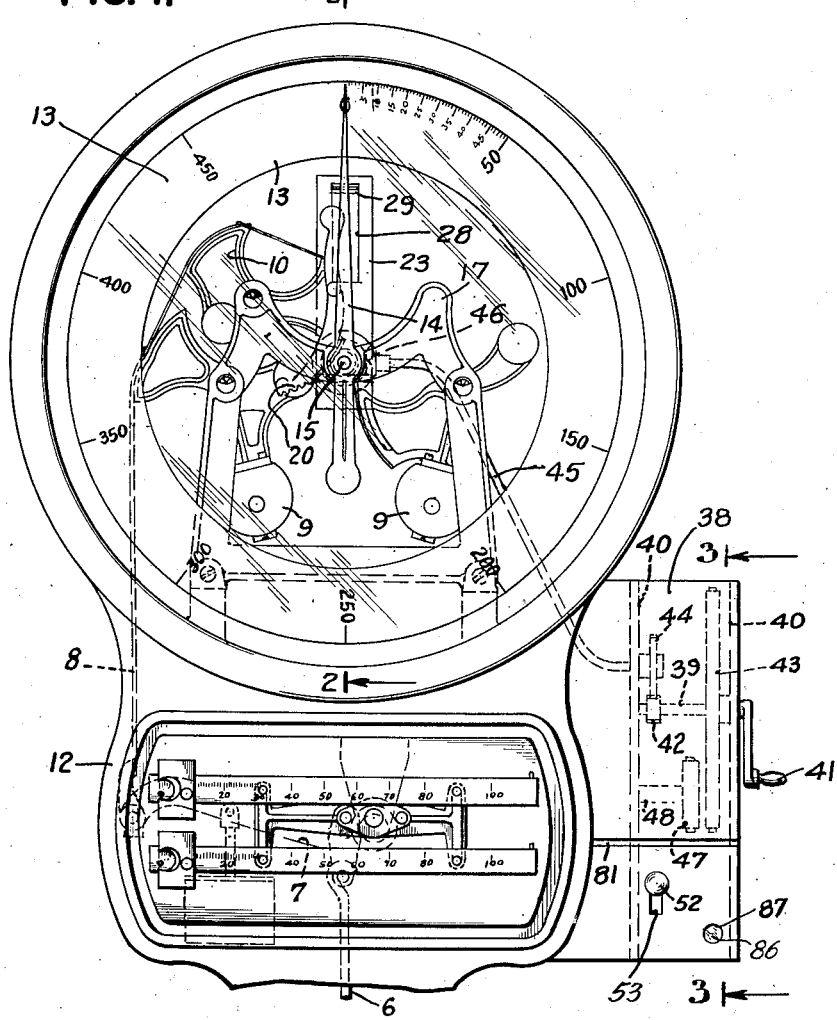
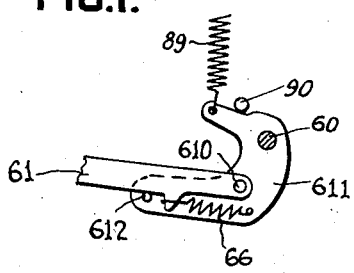
James W. Bryce
INVENTOR
BY ATTORNEY

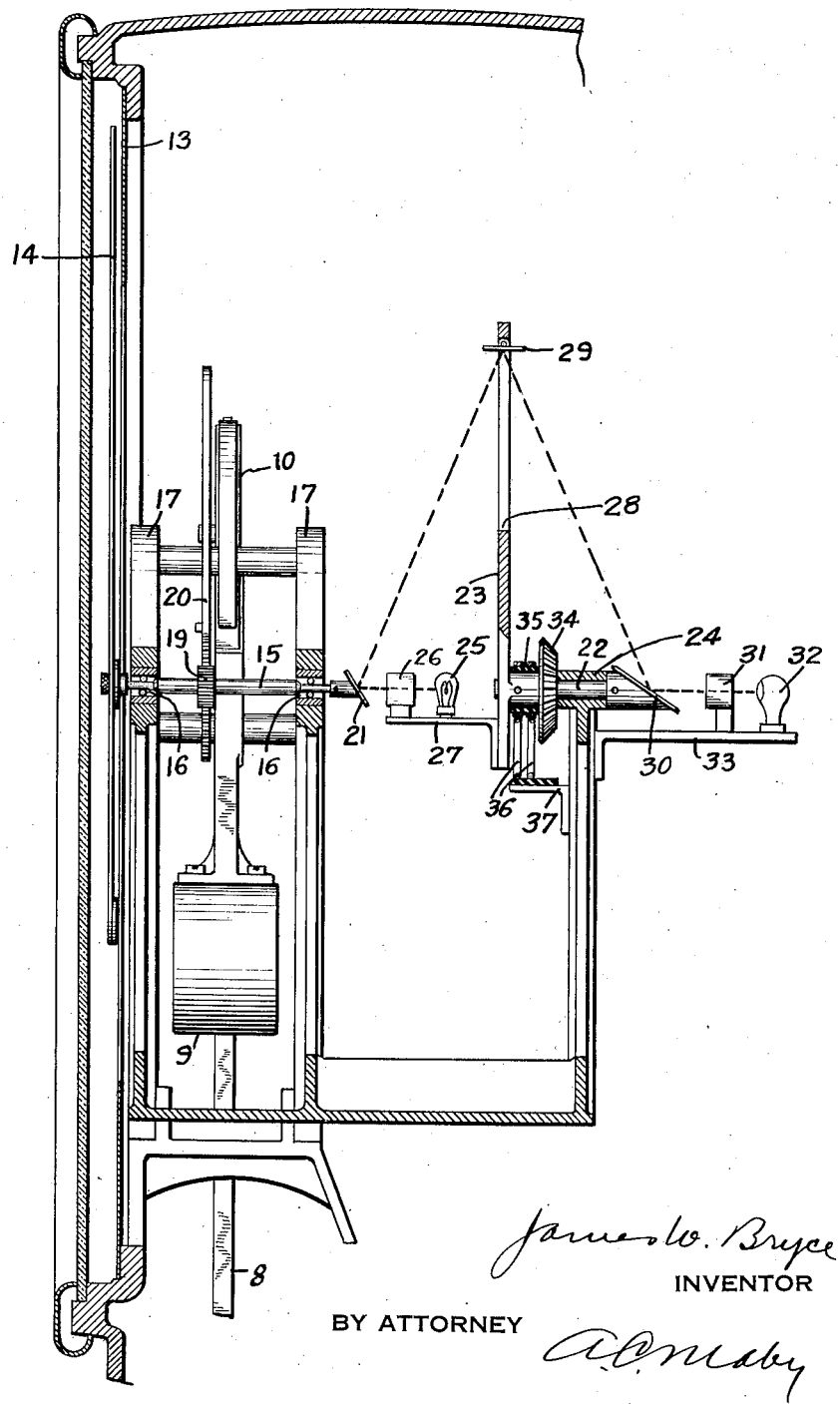

June 8, 1937.   J. W. BRYCE   2,083,362
RECORDING MECHANISM
Filed Jan. 10, 1931   6 Sheets-Sheet 3

James W. Bryce
INVENTOR
BY ATTORNEY

June 8, 1937.   J. W. BRYCE   2,083,362
RECORDING MECHANISM
Filed Jan. 10, 1931   6 Sheets-Sheet 4
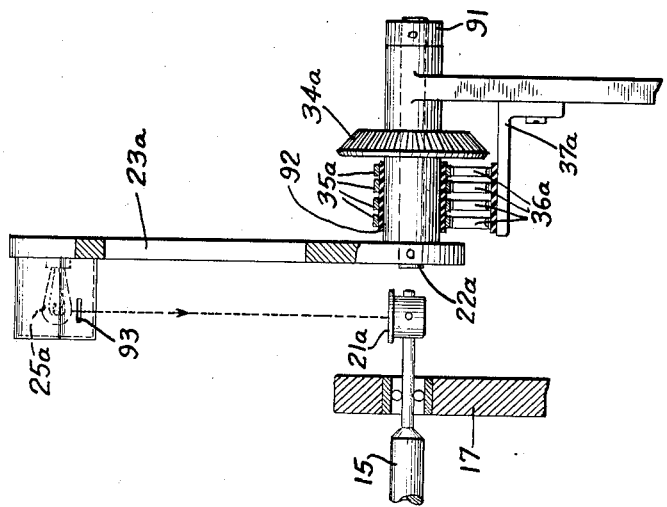
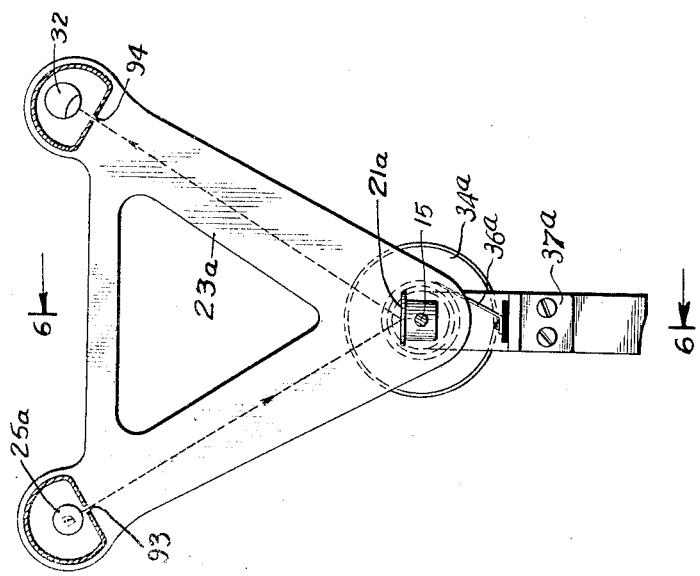
James W. Bryce
INVENTOR
BY ATTORNEY June 8, 1937.   J. W. BRYCE   2,083,362
RECORDING MECHANISM
Filed Jan. 10, 1931   6 Sheets-Sheet 5

James W. Bryce
INVENTOR
BY ATTORNEY

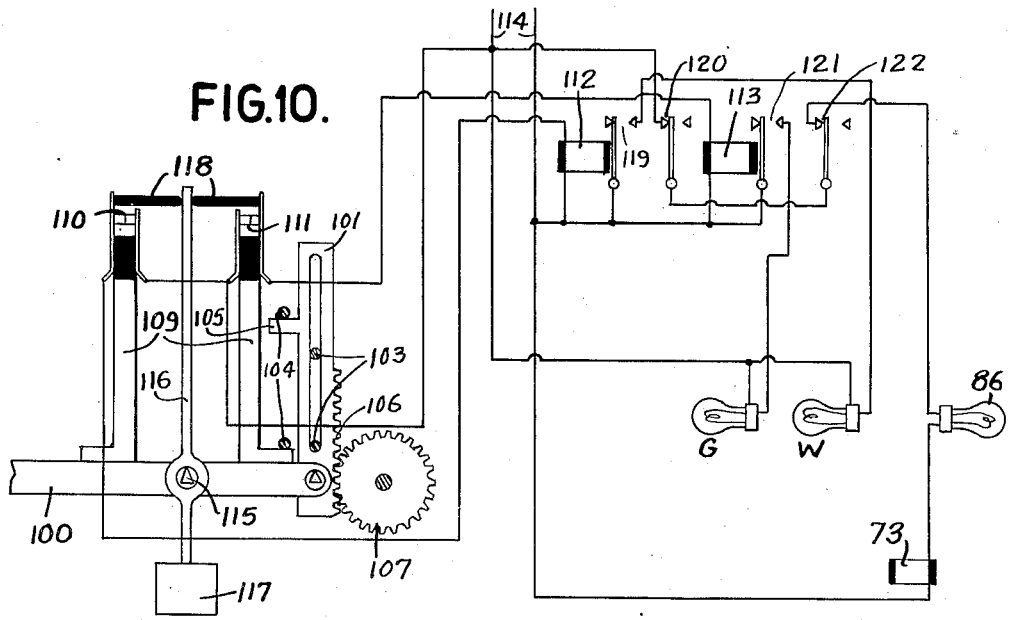
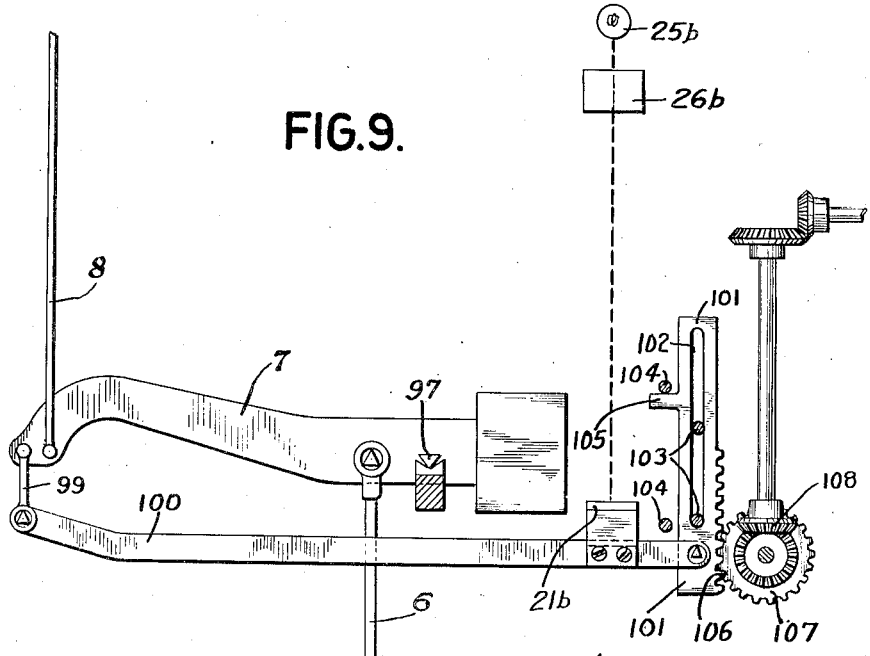

Patented June 8, 1937

2,083,362

UNITED STATES PATENT OFFICE 2,083,362

RECORDING MECHANISM

James W. Bryce, Bloomfield, N. J., assignor, by mesne assignments, to International Business Machines Corporation, New York, N. Y., a corporation of New York Application January 10, 1931, Serial No. 507,860

13 Claims. (Cl. 234—1.5)

The present invention relates to weighing scales having a suitable pointer or other device for indicating the weight of loads placed upon the scale platform and particularly to scales in which provision has been made for printing the weight indicated upon a suitable record medium such as a check, sales slip, delivery slip, or the like.

This invention is an improvement in the construction illustrated and described in copending application Serial No. 450,041, filed May 5, 1930, by James W. Bryce now Patent No. 1,896,284, which illustrates a scale equipped with a movable pointer, a stationary graduated dial cooperating therewith, and auxiliary mechanism including printing mechanism having an operating handle and means for setting the type wheels to correspond with the weight indicated by the pointer. The operating handle in said application is provided with interlocking mechanism which prevents an operation of said handle when the type wheels have not been set to exact agreement with the weight indicated by the pointer thereby preventing an erroneous record being made upon the record medium of the weight of the load placed on the scale platform.

The primary object of the present invention is to provide a novel and improved arrangement for controlling auxiliary mechanism for a scale, such as weight recording mechanism, which has no direct connection to the weighing mechanism and has interlocking mechanism for positively preventing an operation of the auxiliary device until the said device has been positioned in exact accordance with the weight of the load.

Another object of the present invention is to provide an interlocking mechanism for the purpose mentioned which has no direct mechanical connection with the weighing mechanism such as would impose a load on said mechanism in contradistinction to the mechanism illustrated and described in the aforementioned application thereby avoiding any possibility of undesired interference with the functioning of the weighing mechanism.

Another object is to provide novel means for notifying the operator when the printing mechanism has been unlocked and is ready for a printing operation.

A further object is to provide an interlock of the nature described which is more reliable in its operation, requires few adjustments, does not interfere with the accuracy of the weighing mechanism, and is incapable of derangement by a careless or inattentive operator.

Various objects, advantages, or features of the present invention will be pointed out in the following specification and claims or will be clear from a study thereof and of the accompanying drawings:

In said drawings:

Fig. 1 is a front elevation of the upper part of a scale in which the present invention has been embodied.

Fig. 1a is a detail of the hammer and its carrier forming part of the printing mechanism.

Fig. 2 is a vertical section through the scale shown in Fig. 1, the section being taken substantially on the line 2—2 in said figure.

Fig. 5 is a detail front view of a modification of the intercontrol between the scale mechanism and recorder forming part of the invention.

Fig. 6 is a vertical section of the modification illustrated in Fig. 5 and is taken substantially on the line 6—6 in said figure.

Fig. 9 is a detail view illustrating the construction of the embodiment illustrated in Fig. 7.

Fig. 10 is a diagrammatic view illustrating an electrical contact form of the inter-control between the weighing and the auxiliary mechanisms as used in place of the electro-optical form shown in Figs. 7 to 9.

Figure 3:
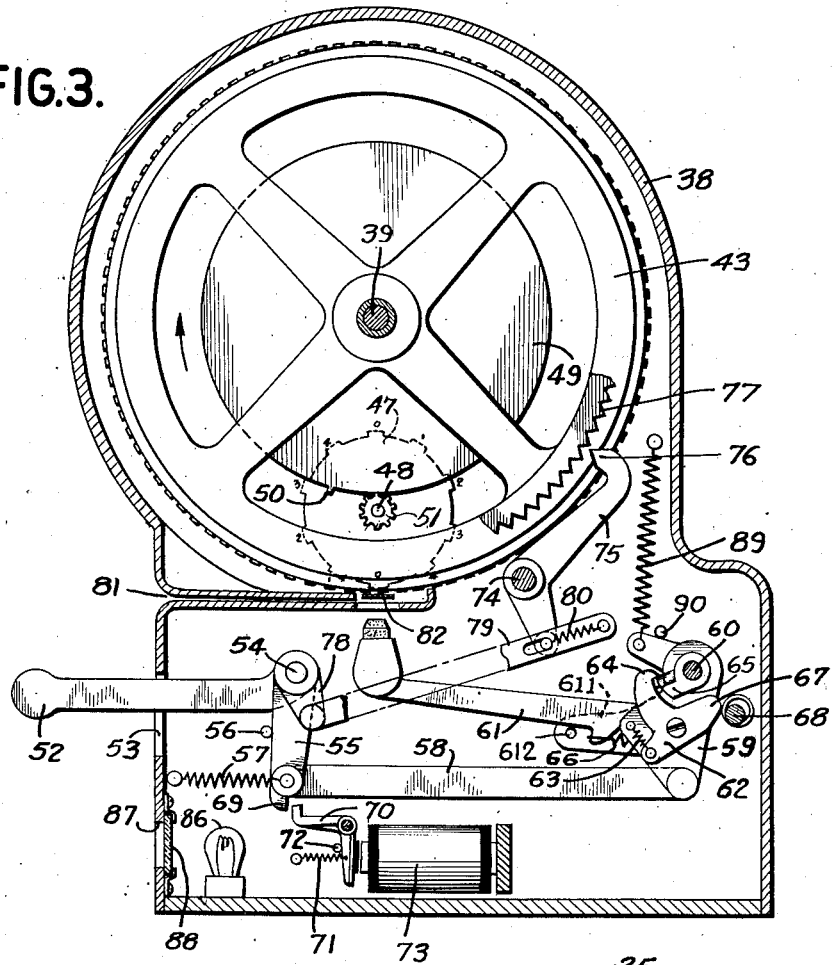
Fig. 3 is a vertical section taken substantially on the line 3—3 of Fig. 1.

The weighing mechanism may be of any desired construction and for purposes of the disclosure, the weighing scale of Patent No. 1,870,233 has been chosen as entering conveniently into the present combination. Only such parts of the scale as are necessary to an understanding of the instant invention will be described and shown. For details of the scale, reference may be had to aforesaid patent. It will be sufficient to remark that the weighing mechanism is contained in a casing or cabinet standing upright on a suitable base carrying a base lever system (not shown) supporting a platform. The base lever system transmits the force of the load on the platform to a draft rod 6 which rocks an intermediate beam or lever 7 connected by a tape 8 to pendulums 9 and intermediate even balanced lever 10. The cabinet 12 has its upper part somewhat cylindrical in shape to house the dial 13, pointer 14 and parts of the interlocking mechanism to be described hereinafter. A suitable pane of glass closes the opening in front of the dial and renders the cabinet dust-tight and at the same time permits the dial to be viewed. The pointer 14 is rigidly mounted upon a shaft 15 supported by anti-friction bearings 16 carried by the frame 17 which supports the pendulum system. A pinion 19 meshing with a rack 20 carried by balanced lever 10 provides the necessary connection between the weighing mechanism and the pointer 14 so that the weight of loads on the platform of the scale will be indicated by the pointer 14 in a well-known manner. The present capacity or weighing range of the scale is 500 lbs. and accordingly, the pendulum system is so designed that rack 20 will move pinion 19 and pointer 14 a single rotation for a movement of the pendulum system from zero load to 500 lbs. load. The dial 13 has a single row of graduations at pound distances apart and is graduated from 0 to 500 lbs. Any load on the scale within these limits will move the pointer 14 to the point opposite dial 13 which is graduated to indicate the active load.

In the form of the invention shown in Figs. 1 to 4 a mirror 21 is mounted upon the right end of shaft 15 (Fig. 2) with its reflecting face inclined at an angle to the axis of the shaft 15.

A shaft 22, coaxial with shaft 15 and spaced therefrom, carries an arm 23 fast thereto and is journalled in a bearing 24 carried by the main frame. The arm 23 and parts carried thereby will be collectively referred to hereinafter as the "finder," intercontrol, sensing or reading mechanism to inter-associate or cooperatively connect the weighing mechanism to the auxiliary mechanism, or to state it more specifically to govern the correct setting of the type wheels in agreement with the weight indicated by finding sensing, or reading the displacement of the pointer 14. The finder 23 holds part of an optical device which includes a light source which may consist of an incandescent lamp 25 having a concentrated filament and a lens system 26 which preferably is arranged as a condenser to cause the rays of light from source 25 to be concentrated in a beam or pencil of light directed horizontally upon the center of mirror 21.

It will doubtless be found desirable in practice to enclose the light source 25 in a suitable lamp housing having a mirror or reflector for the purpose of efficiently utilizing the light from source 25 thereby reducing the size of light source necessary to secure best results.

The light source 25, its housing, and lens system 26 are all carried by a bracket 27 fastened to the arm 23. Mounted in an opening 28 formed on the free end of the arm 23 is a mirror 29 facing downwardly and arranged to be substantially horizontal so that under certain circumstances the beam of light cast on mirror 29 by mirror 21 will be reflected downwardly by mirror 29 toward the right upon the center of a mirror 30 fastened to the right end (Fig. 2) of shaft 22 and thence will be reflected horizontally to the right. It is preferable that for best results the direct horizontal beam from source 25 striking mirror 21 and the reflected beam from mirror 30 should be both coaxial with the shafts 15 and 22. The horizontal beam from mirror 30 is directed through a relatively small opening or slit in a member 31 into the window of a light sensitive medium such as a photoelectric cell 32, the latter and the member 31 being mounted upon a suitable bracket 33 carried by the main frame. If desired the photoelectric cell 32 may be shielded from the effects of stray light by means of a suitable housing.

The hub of the arm 23 has fixed thereto a bevel gear 34 by means of which the part 23 and the parts carried thereby, the whole constituting the finder, may be rotated about the center of shaft 22 as an axis in a manner to be described in detail later herein. A pair of collector rings 35, carried by an insulating bushing mounted upon the hub of the arm 23, are connected to the light source 25 and, through brushes 36 carried by a bracket 37 attached to the main frame, are connected to the source of current for operating the light source 25.

The printing mechanism is contained within a casing 38 (Figs. 1 and 3) which is shaped to conform to the contour of the main scale casing 12. A shaft 39, journaled in frames 40 in the casing 38, has fixed thereto a crank 41 outside of the casing 38 and also has fixed thereon a pinion 42 and a type wheel 43. The pinion 42 meshes with a gear 44 adapted to drive a flexible shaft 45 which in turn drives a bevel pinion 46 meshing with the bevel gear 34 fixed to the hub of the finder part 23. It will be clear, therefore, that the finder may be moved to correspond with any desired point indicated on the dial 13 by the pointer 14 by simply turning the handle of crank 41 until the arm 23 and pointer 14 correspond angularly, that is, until their longitudinal axes are parallel. The ratio of the gearing is such that one revolution of crank 41 will move the finder through a range equivalent to 100 pounds on the scale dial 13.

The type wheel 43 is provided with one hundred type characters reading from "00" pounds to "99" pounds to correspond with each division on the scale dial 11 over a range of 100 pounds. A second type wheel 47, adjacent to the type wheel 43, is carried by a short shaft 48 supported by the left printer frame 40 (Fig. 1) and is provided with two sets of type characters reading from "0" to "4" representing hundreds of pounds. While one set of characters may be dispensed with, it is preferred to use two sets in order to permit the type wheels to be moved the shortest distance, in either direction, from positions corresponding to a certain load point to the positions corresponding to a different load point. Normally the type wheel 47 is positioned so a zero type is presented at the printing line when the finder is set vertically to coincide with the zero on the scale dial 13. An obvious alternative is to omit the "0" type legends and leave the "0" positions of the type wheels blank in order to avoid printing a cipher from the wheel 47 when the load weighed is less than 100 pounds.

A transfer disk 49 is fast to type wheel 43 and is provided with a single tooth 50 adapted to engage the teeth of a pinion 51 integral with type wheel 47. It will be clear that a complete revolution of type wheel 43 in either direction will bring the tooth 50 into engagement with the teeth of pinion 51 and turn the type wheel 47 one tooth. Thus, if the finder is to be turned from zero position to bring the free end thereof into angular coincidence with the pointer 14 indicating 415 pounds, for example, the type wheel 43 will need to be revolved four and a fraction times by means of crank 41 until the finder corresponds angularly with the pointer 14 and at each revolution of type wheel 43 the type wheel 47 will be advanced one increment or tooth space or four tooth spaces in all. The foregoing operation will bring the "4" type character on type wheel 47 and the "15" type character in type wheel 43 to the printing line so that "415" will be eventually printed. The shaft 39 rigidly carries both crank 41 and type wheel 43. Since one revolution of the crank moves the finder through an arc equal to a range of 100 lbs. of the scale dial, as previously explained, then when the type wheel 43 has made one revolution, the finder will have covered a 100 lb. arc. Therefore, in the selected example when type wheel 43 makes four revolutions plus the fifteen hundredths of a revolution corresponding to fifteen units, the finder will have moved through an arc covering 400 lbs. plus fifteen hundredths of the 100 lb. arc or through a total arc of 415 lbs. of the scale dial. The entire finder and the scale pointer shaft 15 are spaced apart and separate so that movement of one can have no deterrent effect on the other. If the finder is now turned to correspond angularly with the zero point on scale 13 the pinion 50 will be reversely turned one tooth for each of the four complete revolutions and slightly more of handle 41 required to bring the finder back to its original upright position in consequence of which the type wheels 43 and 47 will again present their zero positions at the printing line.

The printing handle 52 projects through a slot 53 in the casing 38 and is fixed to a shaft 54 journalled in the frames 40 supporting the printing mechanism. An arm 55 is secured to the shaft 54 and is normally held against a fixed pin 56 by means of a spring 57. A link 58 is pivotally connected to the end of arm 55 and also to a member 59 journalled upon a shaft 60 carrying a printing hammer 61. A three armed latch member 62 pivoted on the member 59 is normally held by a spring 63 with the hooked portion 64 overlying and in engagement with an arm 65 secured to shaft 60. The hammer 61 is pivotally mounted by pin 610 (see Fig. 1a) upon an arm 611 fast to the shaft 60, and is resiliently held against a stop pin 612 carried by the said arm by means of a spring 66.

The tail 67 of the latch 62 is adapted to cooperate with a trip stud 68 having an eccentric portion which may be adjusted by turning the stud 68 so as to adjust the point at which tripping of the latch 62 occurs. The arm 55 is provided with a projection 69 adapted to cooperate with one arm of a locking member 70 held by a spring 71 against a fixed stop 72. An armature carried by the other arm of member 70 is adapted to be attracted by a locking magnet 73 carried by the frame of the printing mechanism.

Pivoted at 74 is a type aligning member 75 having a tooth 76 adapted to engage interdental spaces 77 formed in the type wheel 43 and corresponding with the type characters. An arm 78 fast upon shaft 54 is connected to the member 75 by means of a link 79 having a pin and slot connection with an arm of said member 75, a spring 80 normally holding the pin in the right end of the slot (Fig. 3).

The casing 38 of the printing mechanism is formed with a slot 81 into which may be slipped a suitable card or other record medium such as a bill or sales slip previous to operating the handle 52 to cause type wheels 43, 47 to print upon said medium. A suitable inking ribbon 82 is provided and may be operated in any desired manner. Since the ribbon mechanism can be of any desired type no details will be given herein as it does not constitute a part of the invention.

Figure 4:
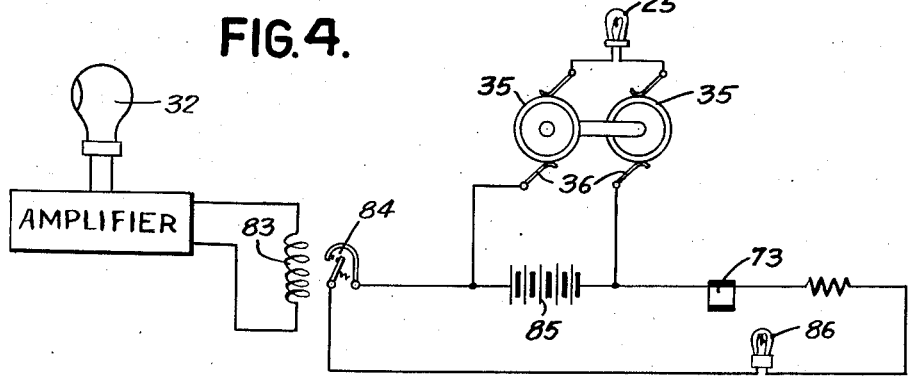
Fig. 4 is a circuit diagram of the embodiment illustrated in Figs. 1 to 3.

The electric circuits involving the lamp 25, magnet 73, and the photoelectric cell 32 are shown diagrammatically in Fig. 4. The photoelectric cell 32 is connected to a suitable amplifier the out-put of which controls a relay magnet 83 adapted to close normally open contacts 84 in series with the source of electric current 85, a signal lamp 86, and the magnet 73. The lamp 25, previously referred to as part of the finder or intercontrol, is connected to the source of current 85 through collector rings 35 and brushes 36 and is constantly illuminated. The signal lamp 86 in series with magnet 73 is not illuminated except when contacts 84 close to connect both magnet 73 and lamp 86 to the source of current 85.

The lamp 86 may be mounted in the casing 38 near the lower right hand front corner thereof (Fig. 1) or the lower left hand corner as viewed in Fig. 3 behind a circular opening 87 which may be provided with a pane of glass 88 of brilliant hue such as the color red so that the operator will know instantly when the magnet 73 has been energized to unlock the operating handle 52 since the lamp 86 will be illuminated simultaneously with the energization of said magnet.

The operation of the mechanism just described will now be described in detail, it being assumed that a load of 450 pounds has been placed on the scale platform thereby causing the pointer 14 to indicate that weight on the dial 13. The operator slides the record medium into the slot 81 so that the said record medium occupies a position between the inking ribbon 82 and the platen on the printing hammer 61. The next stop is to grasp the handle 41 and turn it forwardly in the manner already described herein to position the type wheels 43, 47 to present both the "4" type character on the wheel 47 and the "50" type characters on the wheel 43 at the printing line. If the finder previously coincided angularly with the pointer 14 when said pointer was in the zero position, the handle 41 will have to be turned four and one-half times in order to again bring the finder into angular coincidence with the pointer 14 in its new position. The finder may be set approximately by observing its movement through the glass front protecting the dial 13 which is ring-shaped to permit viewing the interior of the cabinet. When the operator sees that the finder is nearing angular coincidence with the pointer 14 he will turn the handle 41 more slowly thereby causing the beam of light reflected from mirror 30 to gradually approach the slit in member 31 until eventually the beam passes through said slit into the photoelectric cell 32.

As soon as the beam of light enters said photoelectric cell a much stronger flow of current will be caused to flow through the relay 83 with the consequence that the relay will close its contacts 84 thereby illuminating the signal lamp 86 and energizing the magnet 73 which will attract its armature to unlock the operating handle 52 of the printing mechanism by removing the obstructing arm of member 70 from the path of projection 69 so that the operating handle 52 will be free to be depressed. When the lamp 86 becomes illuminated the handle 41 will be released instantly by the operator who will then depress the handle 52 to effect printing of the weight indicated by the pointer 14 upon the record medium since the type wheels 43, 47 will now be in exact agreement with the weight indicated by the pointer 14.

A depression of handle 52 moves link 79 to the right (as viewed in Fig. 3) to thereby rock alining pawl 75 counterclockwise into mesh with a tooth space 77 which corresponds to the even pound position of the type wheel 43 nearest the weight on the scale. The type wheel 43 is thereby locked in position so that the printing will be effected with the wheel 43 stationary. As the handle 52 is moving the pawl 75 to lock the type wheel 43, it forces the link 58 to the right (Fig. 3) thereby rocking member 59 counterclockwise with the result that the hook 64 in latch 62 will draw down the arm 65 and rock the shaft 60 in a counterclockwise direction against the tension of a spring 89 which is interposed between a fixed stud and arm 611 fast to shaft 60. Movement of the shaft 60 in a counterclockwise direction will eventually bring the tail 67 of the latch 62 into contact with the eccentric stud 68 and as a result the hook in the latch 62 will become disengaged from the arm 65 whereupon the spring 89 will rock the shaft 60 in a clockwise direction until the arm 611 to which said spring 89 is attached strikes a fixed pin 90. When this happens the momentum imparted to the hammer 61 will carry the hammer a further amount upwardly against resistance of spring 66 to cause a platen on the hammer to force the record medium and the inking ribbon 82 against the type characters on the type wheels 43, 47 at the printing line. It will thus be seen that the hammer will strike a percussive blow at the printing line thereby ensuring a clear impression of the type characters upon the printing medium.

If it should happen that the finder has not been properly positioned, that is, if it should happen to be a pound or two displaced from the correct position as would happen if the handle were moved too far, the beam of light reflected from the mirror 30 will not enter the slit or opening in member 31; therefore the photoelectric cell will not be strongly energized and as a consequence the relay 83 will not be energized to an extent sufficient to close the contacts 84. It will be seen, therefore, that in this case the magnet 73 will not be energized and the obstructing arm of locking member 70 will remain in the path of the lug 69 and arm 55 and prevent movement of the operating handle 52. It is clear from the foregoing that the arrangement including the light source 25, the mirrors 21, 29, 30, photoelectric cell 32, the amplifier relay 83 and magnet 73 provides a device for reading or sensing the displacement of pointer 14 for the positioning of the type wheels and an interlock or intercontrol which positively prevents a printing operation from taking place unless the finder has been properly positioned in angular coincidence with the pointer 14. In other words, the finder must be placed with its axis substantially parallel with the axis of the pointer 14 before the beam of light will be reflected through the opening in the member 31 into the photoelectric cell.

Figs. 5 to 10 illustrate several modifications in the construction just described, similar reference characters being used as much as is possible to indicate identical parts in the embodiment shown in Figs. 1 to 4. The printing mechanism is identical in the several modifications and is similarly unlocked when magnet 73 is energized.

There is illustrated in Figs. 5 and 6 a modified form of the finder shown in Fig. 2. In the modification referred to the optical system includes a light source 25a and a photoelectric cell 32a carried by a triangular frame 23a on shaft 22a. Source 25a and cell 32a are arranged for cooperating with a mirror 21a mounted upon the shaft 15 with its surface parallel with the axis of the shaft 15. Figs. 5 and 6 illustrate the normal position when both pointer 14 and the type wheels 43, 47 are in zero position.

The frame 23a is carried by the shaft 22a and is turned, by means such as shown in Fig. 1 and including the crank 41, through a bevel gear 34a similar to the bevel gear 34, a suitable collar 91 holding the shaft 22a in place. Four collector rings 35a, carried by an insulating bushing 92 mounted upon the hub of frame 23a and cooperating with brushes 36a mounted upon a fixed bracket 37a, serve to connect the photoelectric cell 32a and the light source 25a to the circuits shown in Fig. 4. It will be observed that a slit 93 in the housing of light source 25a concentrates a beam of light on the mirror 21a and the latter reflects said beam through a similar slit 94 in the housing of the photoelectric cell 32a. This is also the situation that exists when the pointer and finder 23a have been properly alined regardless of the position of the pointer. It is a simple, well-known fact of optics that when a mirror turns through an angle with respect to an incident ray, that the reflected ray shifts through twice said angle. Thus, in Fig. 5, if mirror 21a carried by pointer 14 moves through an angle with respect to the finder, the beam reflected from mirror 21a to photocell 32a will depart from the line of reflection indicated in Fig. 5 by twice the angle of shift of the mirror. Further, if the finder moves through an angle with respect to the mirror 21a, the incident ray will shift through said angle and the photocell will also shift through the same angle. The reflected ray will have shifted through the same angle with respect to its line of direction shown in Fig. 5 but since the photocell has in addition shifted in the opposite direction through said angle, the photocell will now have shifted a total of twice said angle with respect to the new line of reflection. Therefore, it is clear that movement of the pointer 14 or the finder in either direction through a small angle will cause the beam of light to be deflected through twice the angle of deflection of pointer 14 with respect to the finder, consequently great accuracy may be secured in the setting of the finder, and it will be found that the magnet 73 will be energized and the lamp 86 illuminated only when the finder has been adjusted to the exact point at which the type wheels 43, 47 correspond with the weight indicated by the pointer 14.

It may here be noted that in regard to the form of the invention shown in Figs. 1 to 4, for reasons similar to those just stated, the deflection of mirror 21 through any angle will shift the reflected beam through twice such angle. Similarly, the shifting of mirror 29 through any angle with respect to the beam projected thereon will shift the reflected beam from mirror 29 through twice said angle. Thus, the slightest variation from coincident position of either the pointer or the finder will sensitively and with multiplied effect throw photocell 32 out of the line of energization.

Figure 7:
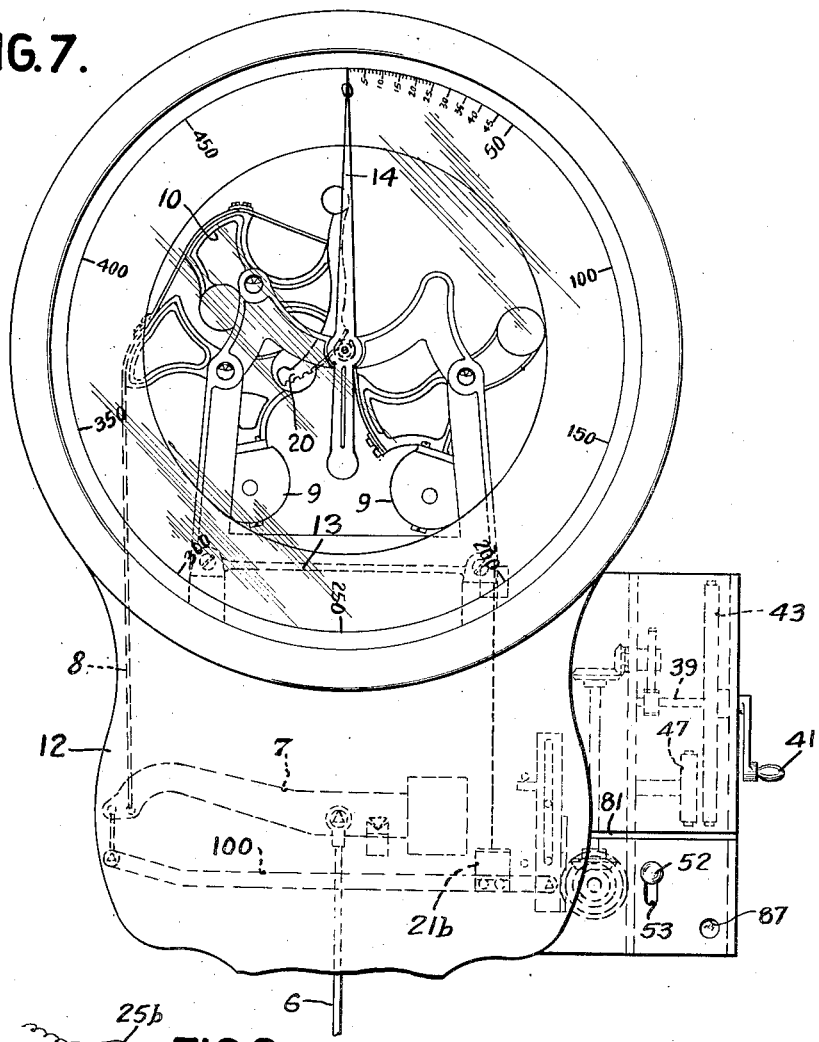
Fig. 7 is a front view of a scale such as the one shown in Fig. 1 and illustrates another embodiment of the invention.
Figure 8:
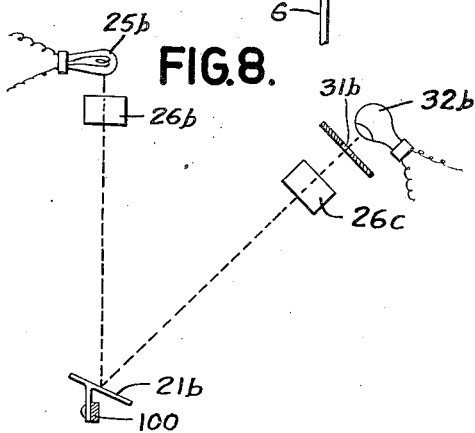
Fig. 8 is a diagrammatic view illustrating the principle of the embodiment illustrated in Fig. 7.

A further modification is illustrated in Figs. 7 to 9 showing the manner in which the locking mechanism may be controlled by means of a pivoted beam connected with the weighing mechanism in such a manner as to eliminate any possibility of imposing a load reaction or interferent effect on the weighing mechanism. The scale shown in Fig. 7 is identical in construction with the scale shown in Fig. 1 and has identical printing mechanism, a dial 13 and a pointer 14.

Previously mentioned intermediate beam 7 is fulcrumed to the frame on knife edge bearings 97. Connected to the left end of beam 7 (Fig. 9), by means of a link 99, is a second beam 100 which is fulcrumed at its right end on a vertically movable slide 101 guided by a slot 102 and pins 103, suitable stops 104 cooperating with a lug 105 on slide 101 serving to limit movement of the said slide in either direction. The slide 101 is provided with rack teeth 106 meshing with a pinion 107 rigidly attached to a bevel gear meshing with a bevel gear 108 which is connected through a train of bevel gears, shafts, and spur gears to the shaft 39 carrying the type wheel 43 hereinbefore described. Fig. 9 illustrates the positions occupied by the various parts when the type wheels present zeros at the printing line and the pointer 14 is indicating zero, no load being on the scale platform, and it will be noted that the beam 100 is substantially horizontal when the foregoing conditions are present. The beam 100 has substantially no variable effect on the weighing mechanism. Its fixed effect is due solely to its weight and the distribution of its weight and, if desired, this effect may be counterbalanced in a number of ways well-known to the art. Initially, with the scale at zero load position, beam 100 is in a definite position, preferably the horizontal position, as shown in Figs. 7 and 9. When the weighing mechanism is acted on by a load, beam 100 rocks counterclockwise to take a downwardly inclined position. As will be explained shortly, in order to position the recording mechanism to record the load, the fulcrum of the beam 100 is moved vertically downward and is in correct control position when it is again horizontal and in its initial, no load position. Therefore, when the recording means is in load-corresponding position, the effect of the beam 100 on the weighing mechanism is the same as when the weighing mechanism is at zero load, so that the beam 100 has no ultimate variable effect on the weighing mechanism but, at most, only a fixed effect which may be compensated for and counteracted in the usual manner by a zero adjustment. It may be noted that during a weighing operation, the beam 100 simply moves about its fulcrum carried on slide 101. Further, since the beam is fulcrumed on slide 101, it exerts no leverage on the fulcrum and therefore when the beam is rocked by its connection to weigh beam 7, it will not tend to move slide 101. It may therefore be properly considered that the finder including beam 100 has no deterrent effect on the weighing mechanism.

Mounted upon the beam 100 is a mirror 21b inclined at an angle to a vertical plane including the longitudinal axis of the beam 100. A light source 25b and condenser lens system 26b are mounted vertically above mirror 21b so that a beam of light projected upon the mirror 21b will be reflected from said mirror through a second condenser lens system 26c and slit 31b into a photoelectric cell 32b (Fig. 8), the second condenser lens system and the photoelectric cell being above and also to one side of mirror 21b, when the beam 100 occupies a horizontal position as shown in Fig. 9, in which position it will be recalled the type wheels 43, 47 and pointer 14 both stand in zero position. It will be understood that the circuits are arranged as in Fig. 4 except for the collector rings 35 and brushes 36 which are not needed in the modification under consideration.

When a load is placed upon the scale platform the left end of beam 7 will be drawn downwardly a distance proportional to the load (Fig. 9) thereby also depressing the corresponding end of beam 100 proportionately to the load with the consequence that the beam of light reflected from mirror 21b will be deflected and will no longer pass through the slit 31b.

As a result the photoelectric cell 32b will not receive enough light to cause energization of the relay 83 to a degree sufficient to cause the contacts 84 to close. The operator now grasps the handle 41 and turns it in the proper direction to lower the right end of the beam 100 until the said beam again assumes a horizontal or level position. The train of gearing connecting the slide 101 and the shaft 39 is so proportioned that if a load of 450 pounds, for example, is placed upon the platform of the scale, it will require four and one-half turns of handle 41 to lower the right end of beam 100 an amount sufficient to restore the beam 100 to a level position. While the beam 100 is being brought back to a level position the beam of light reflected from mirror 21b will move towards the slit 31b and will eventually pass through said slit and again enter the photoelectric cell at which time the type wheels 43, 47 will present type characters representing 450 pounds at the printing line and the lamp 86 will be illuminated as described before thereby indicating that the magnet 73 has unlocked the operating handle 52. The operator then immediately releases the handle 41 and depresses the operating handle 52 to cause the printing of the weight upon the record medium in the manner previously described.

It will be noted that the center of mirror 21b will be lowered by the leveling operation and, when the beam 100 has been leveled properly, the beam of light reflected therefrom will be displaced away from its original position but will still be parallel to its original direction. If the slit 31b alone were used the beam of light reflected from the mirror 21b might not always enter the photoelectric cell after the beam 100 has been leveled, particularly when the scale pointer indicates the maximum weight on the dial. For this reason, the condenser lens system 26c is interposed between mirror 21b and photo cell 32b. The lens system 26c, the size of aperture 31b, and the distances of the mirror 21b and photo cell 32b from the lens system and aperture are so proportioned as to direct sufficient light on the photo cell to energize it in all positions of the mirror when beam 100 is horizontal. For instance, at mid-position of mirror 21b, the reflected beam of light will preferably strike lens system 26c at the center and the lens system will converge the beam of light through aperture 31b and focus it on the photo cell. When the mirror 21b is above or below the mid-position, the reflected beam of light will strike condenser lens system 26c off center but the beam of light still being parallel to the direction shown in Fig. 7, the condenser lenses will still converge a sufficient portion of the light beam through aperture 31b to strike photo cell 32b and energize the latter. This is true only when the beam 100 is in one of its horizontal positions and, thereby, when the reflected beam of light is parallel to the direction shown in Fig. 7. When the load is placed on the scale, before the beam 100 is leveled, the latter will be at an incline, and the beam of light reflected from mirror 21b will be inclined away from the direction shown in Fig. 7 and will either not strike lens system 26c at all or if it does, the lens system will direct the beam of light off to one side of aperture 31b.

Fig. 10 illustrates diagrammatically a modified form of the arrangement shown in detail in Fig. 9, in which normally closed contacts carried by the beam 100 control indicating lamps and the magnet 73, said beam 100 being constructed as in said figure and controlled in identically the same manner as in Fig. 7 by means of the handle 41 through the gears 107 and rack teeth 106 in slide 101. Fixed upon the beam 100 are two spaced uprights 109 supporting normally closed contacts 110, 111 insulated from said uprights and in series, respectively, with relay magnets 112, 113, the contacts 110, 111 having a common connection to one of the line wires 114 connected to the source of current, while the relay magnets 112, 113 likewise have a common connection to the other line wire.

Freely pivoted at 115 to the beam 100 is an arm 116 having a weight 117 arranged to keep the axis of the arm 116 always vertical. The upper end of arm 116 extends between two insulating studs 118 each mounted upon one of the contacts 110, 111. It will be clear from a study of Fig. 10 that rocking of the beam 100 in either direction will result in opening one of the contacts 110, 111 without disturbing the other thereby effecting control of the relay magnets in a manner about to be described.

Each relay 112, 113 controls two sets of contacts, the relay 112 being arranged to open contacts 119 and close contacts 120 while the relay 113 likewise opens contacts 121 and closes contacts 122. In series with the contacts 119 is a white lamp W while a green light G is in series with the contacts 121, the lamps G and W having a common connection to one of the line wires 114 and the contacts 119, 121 having a common connection to the other line wire. The magnet 73, the lamp 86, and contacts 120, 122 are all connected in series across the line wires 114.

The parts occupy the position shown in Fig. 10 when the pointer 14 indicates zero and the type wheels present zero characters at the printing line, the beam 100 being level, consequently both pairs of contacts 110, 111 are closed and connect the relays 112, 113 to the line wires 114. It is apparent that, as long as the beam 100 is level, both relays 112 and 113 will be energized and will hold the contacts 119, 121 open and the contacts 120, 122 closed so that no current can flow through either of the lamps G and W. Since the contacts 120, 122 are closed the relay 73 and lamp 86 will be connected in series to the line wires 114 and the printing mechanism will be unlocked owing to the magnet 73 having removed the obstructing arm of member 70 from the path of the projection 69 so that the operating handle as shown at 52 in Fig. 3 is free to be operated.

If a load of 450 pounds is placed on the scale platform the pointer 14 will move over the dial 13 and indicate said weight while the left end of beam 100 will be depressed proportionately thereby causing the weighted arm 116 to open contacts 111 owing to the resulting relative movement between beam 100 and arm 116. The opening of contacts 111 deenergizes relay magnet 113 thereby effecting closing of contacts 121 and opening of contacts 122, and as hereinbefore explained as a result the green lamp G will be illuminated indicating the direction in which the crank 41 must be turned to restore the beam 100 to a level position while the lamp 86 will be extinguished and magnet 73 deenergized thereby releasing the member 70 which again locks the printing mechanism.

The lamps G and W preferably will be mounted in the casing 38 behind suitable windows bearing therein arrows indicating the direction in which the handle 41 must be turned in order to again bring the beam 100 to a level position and thereby set the type wheels 43, 47 to permit printing 450 pounds on the record medium by operating handle 52.

When the handle 41 has been turned four and one-half revolutions in the proper direction the beam 100 will again assume a level position and contacts 111 will reclose to effect reenergization of relay magnet 113 and reclosing of contacts 122 at the same time opening contacts 121 to extinguish the green lamp G. The closing of contacts 122 again causes the lamp 86 to be illuminated and the magnet 73 to be energized to unlock the printing mechanism. The operating handle 52 may now be depressed to print the weight upon the record medium.

Assuming that the next load to be weighed has the magnitude of 350 pounds and the handle 41 has not been turned backwardly to restore the type wheels 43, 47 to zero position so that said type wheels are still in condition to print 450 pounds, the operations necessary to print 350 pounds will now be described. When the load of 350 pounds is placed on the platform of the scale the left end of beam 100 will be in an elevated position relative to its position during the printing of 450 pounds instead of depressed and as a consequence the contacts 110 will open while the contacts 111 will remain closed. The relay 112 will be deenergized thereby opening contacts 120 and closing contacts 119 with the result that the white light W will become illuminated and signify that the handle 41 must be turned in the opposite direction to which it was turned to set the printing wheels 43, 47 to print 450 pounds. One revolution of handle 41 in the required direction causes the type wheel 47 to turn backwardly to "3", the type wheel 43 being reversely rotated one full revolution so that when the type wheels 43, 47 will now present the numerals "350" at the printing line and the beam 100 will again be level, the white light will be extinguished and the lamp 86 illuminated to indicate to the operator that the handle 52 may be operated to print the weight upon the record medium.

In the modifications shown in Figs. 1 to 9, after each load has been weighed and the weight printed upon the record medium the load will of course be removed from the scale platform whereupon the pointer 14 will return to normal or zero indicating position. When this happens the mirrors 21, 21a, or 21b will be sharply tilted and the beams of light will be deflected an extent sufficient to cause the photoelectric cells to relinquish control upon the relay 83 so that in each case the printing mechanism will be automatically locked. When a new load is placed on the scale, the finder may then be moved by operation of handle 41 in either a forward or return direction, whichever is found most fitting, from its previously occupied position into the new position of coincidence with the scale pointer whereupon the printing handle 52 will again be released to permit the type wheels to print a record of the new load. In the case of the modification shown in Fig. 10 the left ends of the beams 7 and 100 will be raised as soon as the load is removed from the scale platform and remain in such condition as long as the handle 41 and type wheels 43, 47 remain in the position last set. If a heavier load is to be weighed than before the left end of beam 100 will be depressed below the horizontal line passing through the point at which it is pivoted to the slide 101 with the consequence that the white lamp will be extinguished and the green lamp will become illuminated thereby indicating that the handle 41 must be turned farther forward than before to correctly position the type wheels 43, 47 to print the weight indicated by the pointer 14. It will clearly be seen that the form of the invention shown in Fig. 10 provides not merely an interlock between the printing mechanism and the weighing mechanism which positively compels the operator to position the type wheels in exact agreement with the weight indicated by the pointer but also provides a positive signal system which informs the operator the direction the handle 41 must be turned and also informs him when the printing wheels have been correctly set. If desired the lamp 86 may be dispensed with since the beam 100 will always be level when both lamps G and W are extinguished.

The stops 104 in the modifications shown in Figs. 7 to 10 prevent the operator from turning the handle 41 far enough to disarrange the mechanism and also serve to warn him that the handle 41 must be reversed in direction of motion if it is moved until the lug 105 strikes one or the other of stops 104 without the lamp 86 flashing.

The present invention, for purposes of illustration only, has been shown and described as embodied in certain specific forms, although it is desired to point out herein that it is not limited to the particular forms described herein and shown in the drawings but embraces any other forms which by the exercise of mechanical skill may be suited to meet various conditions found in practice.

I claim:

1. In a weighing scale, means displaceable according to a variable, apparatus separate from the first-named means and including positionable mechanism positionable according to displacement of the first-named means and instrumentalities coacting with said positionable mechanism to effect a recording operation, a device for preventing the coaction of said instrumentalities with said positionable mechanism until the positionable mechanism has been positioned in accordance with displacement of the first-named means, and means jointly controlled by the first-named means and a part of the aforesaid apparatus for automatically disabling said preventing device immediately upon the positionable mechanism having been set in position corresponding to displacement of the first-named means.

2. In a scale, an element displaceable according to a variable, positionable mechanism, means operable in either one of two directions for positioning said positionable mechanism according to the displacement of said element, means for signifying the direction in which the positioning means is to be operated to position the positionable mechanism in accordance with the displacement of said element, and means jointly operated by said element and by the first-named means for controlling said signifying means in accordance with the position of the positionable mechanism relative to the aforesaid element.

3. In a scale, means displaceable according to a variable, positionable value bearing means positionable in accordance with the displacement of the first-named means and instrumentalities coacting with the positionable means to manifest a value according to the position of the latter, a device for preventing said coaction of the instrumentalities and the positionable means until the latter has been positioned in accordance with the aforesaid displacement, and means for disabling the preventing device when the auxiliary mechanism has been positioned in accordance with the aforesaid displacement, comprising a photoelectric device, means for causing the photoelectric device to sense the displacement of the first-named means, and means controlled by the photoelectric device to disable the preventing device immediately upon the positionable means having been positioned in accordance with aforesaid displacement.

4. In a scale, an element displaceable according to a variable, recording means including positionable mechanism settable in accordance with the displacement of said element and instrumentalities coacting with the positionable mechanism to effect a recording operation, actuating means for setting the positionable mechanism, a device for preventing coaction of said instrumentalities with said positionable mechanism until the latter has been set in accordance with the displacement of said element, and means for disabling said preventing device when the positionable mechanism has been set in accordance with the aforesaid displacement, comprising a mirror carried by said element, means for projecting a beam of light upon said mirror, a photo-sensitive cell for controlling the disabling of said preventing device, and means controlled by a part of the actuating means for directing said beam of light to said photo-sensitive cell when the positionable mechanism has been set in accordance with the aforesaid displacement.

5. In a scale, means displaceable according to a variable, type elements, positioning means for setting said type elements in accordance with the displacement of the first-named means, instrumentalities coacting with said type elements for effecting printing operations, a device for locking said instrumentalities until the type elements have been positioned in accordance with the aforesaid displacement, a light source, a mirror cooperating therewith and controlled by said displaceable means in a manner to rotate a beam of light received from said source in an arc proportional to the aforesaid displacement, a photo-sensitive cell located to receive said beam and connected to control disabling of the locking device when said beam strikes said medium, and means controlled by the positioning means for directing the light reflected from said mirror to the photo-sensitive cell to thereby effect disabling of the locking device when the type elements have been set in accordance with the aforesaid displacement.

6. In a scale; means displaceable according to a variable, means, including a photo-sensitive cell, for sensing the displacement of the first-named means, value bearing mechanism settable according to the aforesaid displacement, instrumentalities for coacting with the mechanism to manifest a value according to the displacement, and a device controlled by the photo-sensitive cell for locking the instrumentalities until the second-named means has sensed the displacement of the first-named means.

7. In a weighing scale, multi-denominational order elements from which a multi-order record may be taken, instrumentalities operable for coacting with the recording elements to effect a recording operation, a photo-cell device, a source of light, means for controlling transmission of light from said source to said photo-cell device and consequent energization of the latter and including an element interposed between the source and the photo-cell device operable according to a variable for effecting a change in energization of the photo-cell device, and a circuit controlled by the photo-cell device when said change in energization of the latter is effected for controlling operation of said instrumentalities.

8. In a weighing scale, means operable according to a variable, recording means including positionable mechanism displaceable according to the operation of the first-named means, optical devices, a photo-sensitive device controlled by said optical devices in accordance with the operation of the first-named means, and means controlled by said photo-sensitive device for governing displacement of the positionable mechanism.

9. In a weighing scale, means operable according to a variable, an auxiliary means, a photo-cell device, means for controlling energization of the photo-cell device including the first-named means, a circuit controlled by said photo-cell device in accordance with energization of the latter, and means controlled by said circuit for governing operation of the auxiliary means in accordance with the operation of said first-named means.

10. In a weighing scale, an element operable according to a variable, an auxiliary device, a photo-sensitive cell stationary during the operation of said element, a source of radiant energy for said cell, a circuit controlled by the cell for controlling said auxiliary device, and means including said element for controlling the flow of energy from said source to said cell to vary said circuit and thereby govern operation of the auxiliary device in accordance with operation of said element.

11. In a weighing scale, a lever angularly displaced according to a variable, a device auxiliary to the lever, and a photo-cell control between the lever and said device for governing operation of the latter in accordance with the displacement of said lever.

12. In a scale, displaceable means including a lever angularly displaced according to a variable from a position in which the lever is at a predetermined angle to a vertical line, a device auxiliary to the displaceable means, an electrical control for said device, means for returning said lever after its displacement to a position parallel to the first-named position, and means rendered effective upon return of the lever to said parallel position for operating said electrical control.

13. In a scale, an element displaceable according to a variable, an auxiliary electrically operable device, a control circuit therefor, a source of wave emanations, a photo-cell reactive to said wave emanations for governing operation of the control circuit, a second element having a path of travel constantly physically spaced from the path of travel of the first-mentioned element, means for moving the second element at will to a position for cooperating with the first-named element to effect a change in the flow of emanations to the cell, and means operated by the cell upon aforesaid change in the emanations to the cell to effect a control operation by said circuit upon said device.

JAMES W. BRYCE.

DISCLAIMER 2,083,362.—*James W. Bryce*, Bloomfield, N. J. RECORDING MECHANISM. Patent dated June 8, 1937. Disclaimer filed January 11, 1941, by the assignee, *International Business Machines Corp.*

Hereby enters this disclaimer to claims 9, 10, 11, and 13 in said specification.

[*Official Gazette February 11, 1941.*]